(12) United States Patent
Bielich et al.

(10) Patent No.: US 6,630,085 B1
(45) Date of Patent: Oct. 7, 2003

(54) METHOD FOR THE MULTICOMPONENT INJECTION MOLDING OF PLASTIC PARTS

(75) Inventors: Norbert Bielich, Kreuztal (DE); Helmut Eckardt, Meinerzhagen (DE)

(73) Assignee: Battenfeld GmbH, Meinerzhagen (DE)

( * ) Notice: Subject to any disclaimer, the term of this patent is extended or adjusted under 35 U.S.C. 154(b) by 288 days.

(21) Appl. No.: 09/679,744

(22) Filed: Oct. 5, 2000

(30) Foreign Application Priority Data

Oct. 6, 1999 (DE) .......................................... 199 48 278

(51) Int. Cl.⁷ ............................................. B29C 45/16
(52) U.S. Cl. ................. 264/40.1; 264/255; 264/328.4; 264/328.12; 264/328.15; 264/328.19
(58) Field of Search ............................... 264/40.1, 255, 264/328.8, 328.4, 328.9, 328.12, 328.14, 328.15, 328.16, 319, 328.17, 328.19; 425/129.1, 130, 558, 544, 562, 566

(56) References Cited

U.S. PATENT DOCUMENTS

| | | | |
|---|---|---|---|
| 3,030,666 A | 4/1962 | Adams | 18/55 |
| 3,339,240 A | * 9/1967 | Corbett | 425/130 |
| 3,969,461 A | 7/1976 | Boesch et al. | 264/163 |
| 4,029,841 A | 6/1977 | Schmidt | 428/325 |

(List continued on next page.)

FOREIGN PATENT DOCUMENTS

| | | |
|---|---|---|
| CH | 343632 | 8/1955 |
| DE | 1105153 | 2/1956 |
| DE | 972945 | 11/1959 |
| DE | 2128373 | 1/1973 |
| DE | 2753870 | 6/1978 |
| DE | 4321997 | 1/1994 |
| EP | 419911 | 4/1991 |
| EP | 0510414 | 10/1992 |
| FR | 1262619 | 9/1961 |
| FR | 2204499 | 5/1974 |
| FR | 2469270 | 5/1981 |
| WO | WO 0006359 | 2/2000 |
| WO | 0024560 | 5/2000 |

OTHER PUBLICATIONS

Patent abstracts of Japan, vol. 17, No. 159 (M–1389), Mar. 29, 1993–& JP 04 325216 A (Toyoda Gosei Co. LTD), *Zusammenfassung*.

Primary Examiner—Angela Ortiz
(74) Attorney, Agent, or Firm—Hamilton, Brook, Smith & Reynolds, P.C.

(57) ABSTRACT

A method for the multi-component injection molding of plastic parts, in which at least two different plastic components are injected into an injection molding tool to form a plastic part, the method comprising the following steps: a) introducing a first plastic component into a melt accumulation chamber, which is bounded by a piston-like end section; b) subsequently introducing a second plastic component into the melt accumulation chamber; c) transferring plastic melt accumulated in the melt accumulation chamber into the injection molding tool. In one embodiment the pressure conditions in the cavity region are homogenized. For this purpose the invention specifies that, when the plastic melt is transferred in accordance with the above step c), the piston-like end section of the melt accumulation chamber is moved in such a way that it forms part of the cavity wall of the injection molding tool.

12 Claims, 10 Drawing Sheets

U.S. PATENT DOCUMENTS

| | | | | |
|---|---|---|---|---|
| 4,035,466 A | * | 7/1977 | Langecker | 264/241 |
| 4,052,497 A | * | 10/1977 | Monnet | 264/255 |
| 4,650,626 A | * | 3/1987 | Kurokawa | 264/278 |
| 4,678,421 A | * | 7/1987 | Kai et al. | 425/159 |
| 4,701,292 A | * | 10/1987 | Valyi | 264/255 |
| 4,722,679 A | | 2/1988 | Farrell | |
| 5,093,054 A | * | 3/1992 | Hirota | 264/45.1 |
| 5,277,567 A | * | 1/1994 | Bauer et al. | 425/130 |
| 5,366,366 A | | 11/1994 | Yokoyama | |
| 5,435,710 A | * | 7/1995 | Gumery et al. | 425/129.1 |
| 5,500,166 A | | 3/1996 | Sasaki et al. | |
| 5,665,282 A | | 9/1997 | Nakamura | |
| 5,714,102 A | * | 2/1998 | Highum et al. | 264/105 |
| 5,795,509 A | | 8/1998 | Fujikawa et al. | |
| 5,861,182 A | | 1/1999 | Takizawa et al. | |
| 5,925,295 A | | 7/1999 | Nakamura et al. | |
| 6,080,354 A | * | 6/2000 | Miyajima | 264/511 |
| 6,331,263 B1 | | 12/2001 | Abe et al. | |
| 6,342,176 B2 | | 1/2002 | Goto et al. | |
| 6,464,910 B1 | | 10/2002 | Smorgon et al. | |
| 6,475,420 B1 | | 11/2002 | Numrich et al. | |

* cited by examiner

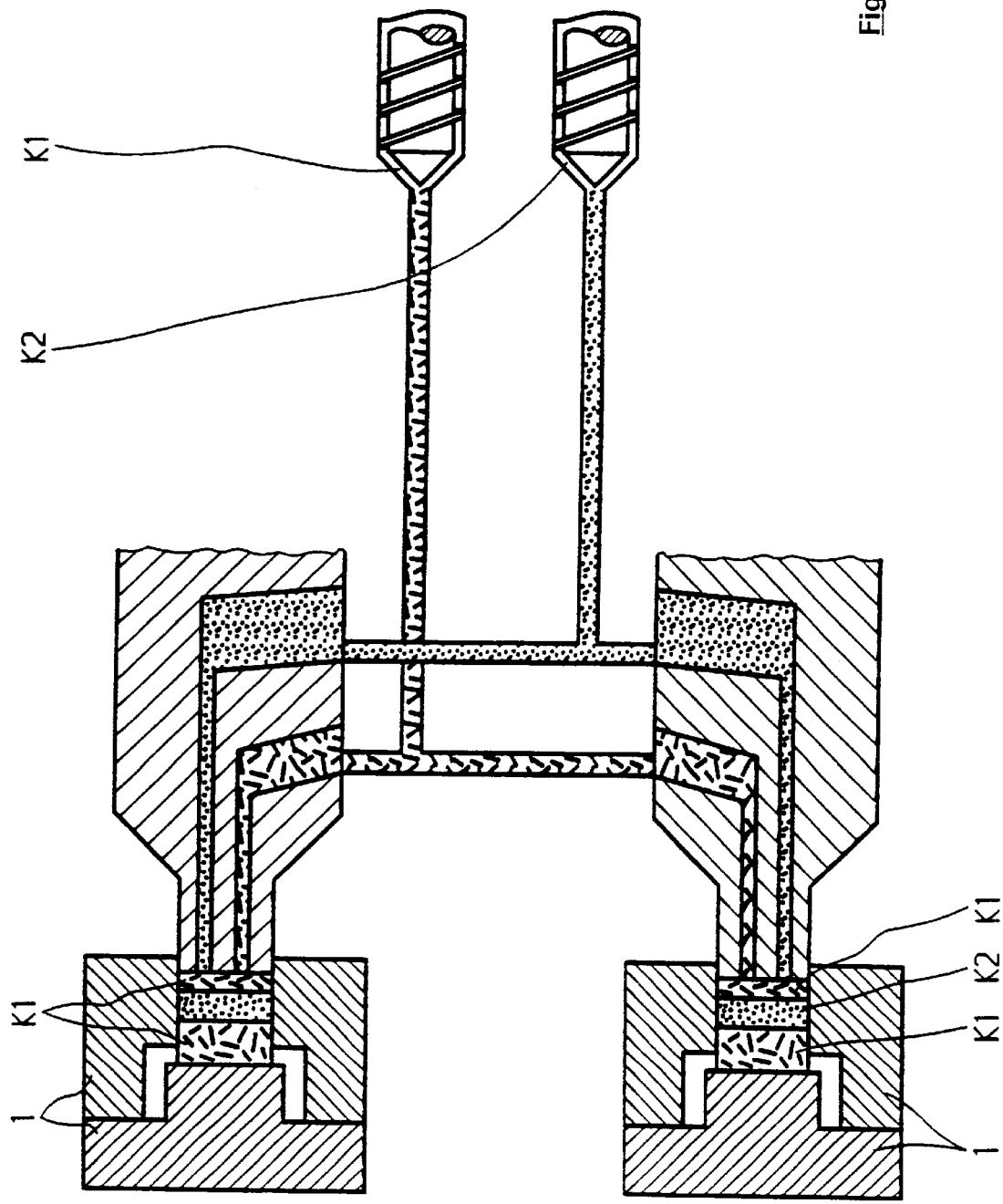

METHOD FOR THE MULTICOMPONENT INJECTION MOLDING OF PLASTIC PARTS

BACKGROUND OF THE INVENTION

A method and an apparatus of the generic type are known from DE-OS 22 59 818. Different plastic materials are melted there in two or more plasticizing units, and are injected into an injection molding tool by a special, controllable multicomponent injection nozzle. This nozzle has a quite complicated structure, for the precise control of the individual melt streams of the respective plastic components.

Other melt injection devices for injection molding plastics are otherwise adequately known in the prior art. For example, from WO 98/09768, an injection molding apparatus is known which—in contrast to the otherwise usual direct injection of plastic melt from the plasticizing and injection unit—introduces melt into a receiver chamber, and subsequently presses this melt into the mold cavity by means of a die. This reduces the operating pressure in the melt. The solution described there has a receiver chamber for receiving the plastic melt needed for one shot, the plastic being moved through a heated passage, by means of an infeed spindle, into a tube, and then, by means of a die, into the receiver chamber. Then the receiver unit is moved to a second position, in which the receiver chamber is flush with an opening into the mold. In this position, a second die then presses the plastic melt into the mold cavity.

As is also the case with this special, previously known solution, it is generally true that, during an injection molding process, the plastic material always must be introduced into the mold via a certain length of flow path. Due to the rheology and the particular fill technique, a high pressure must be applied at the injection point to inject the melt. The pressure then markedly decreases along the flow path. Due to this pressure loss, the pressure at the end of the flow path is much lower than exists at the injection point. This pressure loss along the flow path has the result that very high pressures are needed at the injection point, to assure that the pressure level necessary for completely filling the mold cavity will also exist at the end of the flow path.

To minimize the high pressure losses which occur along long flow paths, it is customary to multiply the gating of molded parts, i.e., the mold cavity is equipped with several injection points. However, this has the disadvantage that weld lines form at points where the various flow fronts meet, thus mechanically weakening the molded part. Another disadvantage is that the several injection points cause strongly differing pressure conditions at various points in the mold cavity.

As a remedy, methods are known whose object is to reduce the interior pressures in the mold. One such method is injection-compression molding, where one works with positive molds. For example, with an enlarged wall thickness, the desired plastic mass is injected and then the mold is collapsed through the closure mechanism of the injection molding machine. The wall thickness is reduced in virtue of the fact that a compression process takes place. It thus becomes possible to assure a uniform compressive pressure, even as far as the end of the flow path. With other methods, the injection process is initially begun with a small wall thickness; when the plastic material is injected into the mold cavity, the wall thickness of the molded part is then increased, until the desired molding compound has been injected completely. Then the closure force is applied to the mold, and the wall thickness is reduced to the desired extent.

All these previously known methods share the disadvantage that special mold techniques and/or processes are needed to assure the lowest possible and uniform pressures in the mold cavity. This requires a quite large expenditure on apparatus and process engineering. Furthermore, in some circumstances, restrictions must be accepted as regards the geometry of the molded part.

SUMMARY OF THE INVENTION

As a result, the invention includes a method and an associated apparatus for injection molding plastic parts comprising several plastic components, so as to avoid or at least reduce the previously known disadvantages. The advantages of the known injection-compression technique should therefore be utilized, without having to accept its disadvantages. Furthermore, attention has to be paid that existing injection molding machines can be appropriately retrofitted without great expense.

In general, in accordance with an aspect of the present invention, a method is provided for the multicomponent injection molding of plastic parts, in which at least two different plastic components are injected into an injection molding tool to form a plastic part. The method includes: a) introducing a first plastic component including a first plastic melt into a melt accumulation chamber, which is bounded by a piston-like end section; b) subsequently introducing a second plastic component including a second plastic melt into the melt accumulation chamber; and c) transferring the plastic melt accumulated in the melt accumulation chamber into the injection molding tool.

In one embodiment, when the plastic melt is transferred in accordance with the above step c), the piston-like end section of the melt accumulation chamber is moved in such a way that it forms part of the cavity wall of the injection molding tool.

One idea of the invention therefore focuses on the injectable melt components initially being accumulated in a first accumulation chamber. Then the injection material is transferred to a second accumulation chamber, which is bounded by a piston surface. When the melts subsequently are injected into the mold cavity, the piston surface is moved in such a way that finally it becomes a region of the actual mold cavity. The piston surface here forms a certain part of the surface (projected as seen in the direction of the piston movement), over which the injection pressure can distribute itself uniformly. This makes the pressure distribution in the mold cavity more homogeneous. The necessary injection pressures can be reduced, which avoids or at least reduces the disadvantages described in the introduction.

It can also be specified that, after step b) and before step c) above, more plastic component is introduced into the melt accumulation chamber. This creates a layering of the plastic materials 1-2-1.

In one embodiment, the piston-like end section of the melt accumulation chamber is situated at an end position before the plastic melt begins to be transferred into the injection molding tool.

Precise control and regulation is quite important with the inventive method; however, this can be done quite simply with injection molding equipment of the prior art. In this connection, the invention can specify that the plastic melt accumulated in the melt accumulation chamber is transferred into the injection molding tool in a manner that is controlled or regulated at least part of the time. The regulation or control, in one embodiment, is effected as a function of the melt pressure in the melt accumulation chamber. The regulation or control can be effected as a function of time, path, or pressure.

In one embodiment, after the plastic melt accumulated in the melt accumulation chamber has been transferred into the injection molding tool, the follow-up pressure is applied to the melt through the piston-like end section of the melt accumulation chamber.

According to other embodiments, the region of the piston-like end section of the melt accumulation chamber is temperature-controlled at least some of the time. This can involve heating as well as cooling.

The method can also be combined with special production processes. In particular, such that, when the plastic melt accumulated in the melt accumulation chamber is transferred into the injection molding tool, a film situated there is back-molded. Alternatively, it is possible that when the melt in the accumulation chamber is transferred into the injection molding tool, a textile material situated there is back-molded.

It is possible to utilize the compression technique; then, after the plastic melt accumulated in the melt accumulation chamber is transferred into the injection molding tool, a compression process is performed through the piston-like end section.

An apparatus for the multicomponent injection molding of plastic parts is provided which includes: at least two plasticizing units to plasticize two plastic materials to provide a plastic melt, a melt accumulation chamber where the plastic melt produced by the plasticizing units is accumulated, and an injection molding tool with a mold cavity.

In one embodiment, the melt accumulation chamber is bounded by a piston-like end section, which is shaped in such a way that it forms at least part of the cavity wall of the injection molding tool.

In accordance with one embodiment, means for temperature control are disposed in the region of the piston-like end section of the melt accumulation chamber.

Furthermore, for precise control and regulation, the invention can provide that valve means are disposed in the melt flow paths so as to disable or enable the throughflow of plastic melt.

In one embodiment, the piston-like end section of the melt accumulation chamber is designed as the end piece of a pre-plasticizing cylinder, in which a plasticizing reciprocating screw is disposed, the pre-plasticizing cylinder being able to move axially. Another embodiment is that the pre-plasticizing cylinder stands in connection with moving means, by means of which the pre-plasticizing cylinder can be moved relative to the injection molding tool.

The pressure in the cavity is reduced especially advantageously if the projected area of the piston-like end section, in its directional motion, makes up a fraction of at least 0.5%, in one embodiment at least 5%, of the projected surface of the total cavity wall in the direction of motion.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8 shows the inventive concept applied to two injection molding tools.

DETAILED DESCRIPTION OF THE INVENTION

Figure 1:
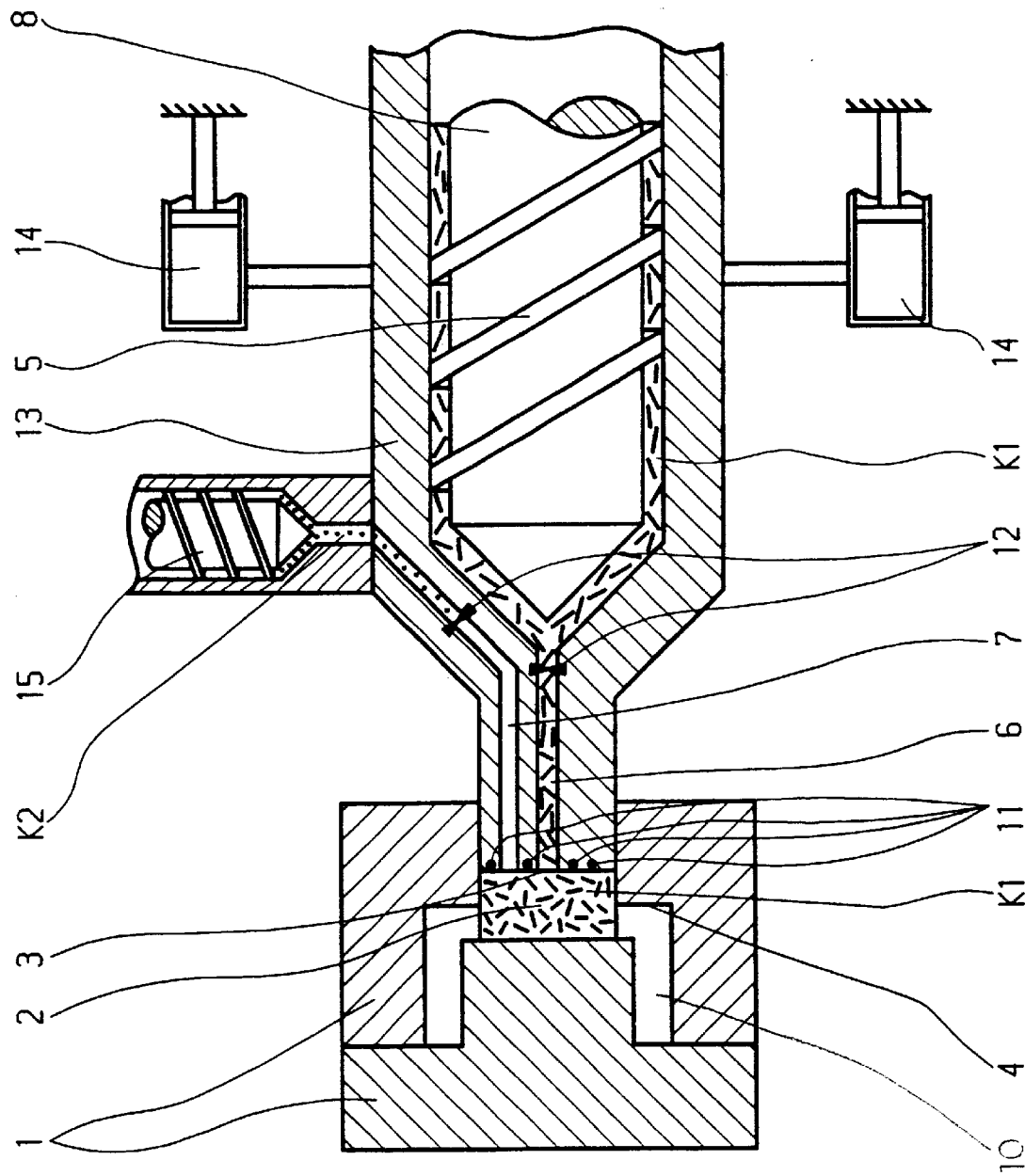
FIG. 1 schematically shows an injection molding apparatus during an early process step.

A description of preferred embodiments of the invention follows. An injection molding tool 1 encloses a cavity 10, in well-known fashion, into which plastic material is injected. A first plastic component $K_1$ is melted in a first plasticizing unit 5. A screw 8, such as a reciprocating screw, is here disposed in a pre-plasticizing cylinder 13.

The space "in front" of the screw 8 forms a first melt accumulation chamber. The melt $K_1$ can flow through a melt flow path 6, from the first melt accumulation chamber to the actual melt accumulation chamber 2. This can occur in a controlled or regulated fashion through the valve means 12, but these means are not necessarily required.

In similar fashion, a second plasticized material $K_2$ is transported, over another melt flow path 7, in front of the piston-like end section 3, likewise in a controlled and regulated manner by the further valve 12. The material itself is processed in a second plasticizing unit 15.

The end of the pre-plasticizing cylinder 13 is formed as a piston-like end section 3. That is when the pre-plasticizing cylinder 13 is moved—namely by the moving means 14—the end of the pre-plasticizing cylinder 13 acts as a piston in a cylindrical bush, which is integrated into the injection molding tool 1, but which is not characterized in more detail. The melt is thus transported from the melt accumulation chamber 2 into the cavity 10.

The means 11 provide at least occasional temperature control of the piston-like end section 3. They can heat or cool as needed, as the rheology and the processed plastic require in the particular case.

Figure 2:
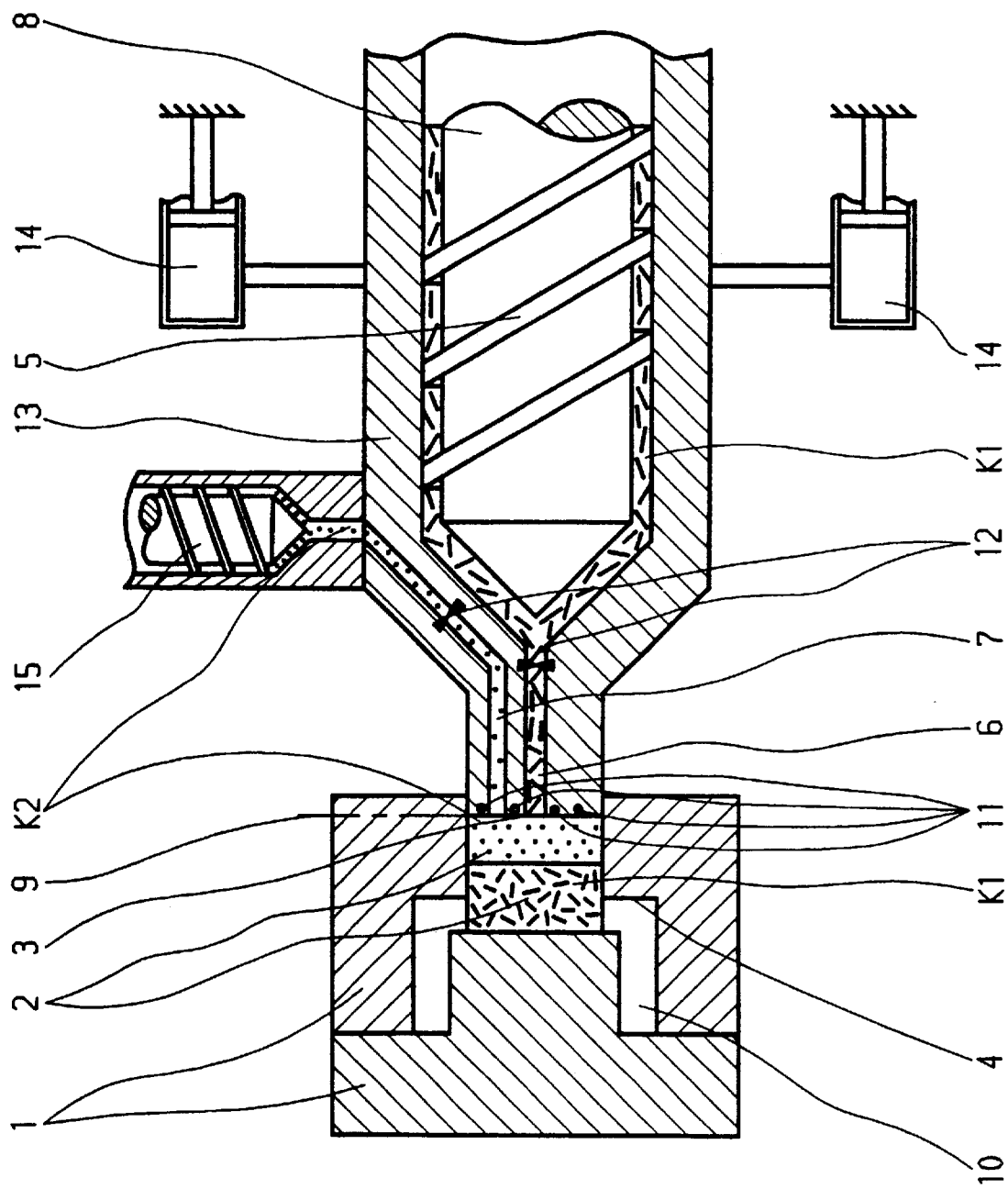
FIG. 2 shows the injection molding apparatus of FIG. 1 during a later process step.

FIG. 1 represents an early stage of the process where melt of the first kind has already been plasticized through the screw 8 and accumulated in the first melt accumulation chamber 2. The piston-like end section 3 preferably is initially situated in such a position that the section 3 is flush with the cavity wall 4 (that is all the way "left")—which is not shown. To the extent that melt flows through the flow path 6, from the space before the screw, over into the accumulation chamber 2, the piston-like end section 3 is moved "to the right," so that the volume needed for the melt is formed in front of the end section 3. This continues until the end section 3 is situated in a first intermediate position. This stage is shown in FIG. 2. The intended quantum of the first plastic melt is now present in the melt accumulation chamber 2.

FIG. 2 shows how the plastic melt of the other kind ($K_2$) was transferred from the second plasticizing unit 15, through the flow path 7, into the melt accumulation chamber 2. Two plastic layers therefore are now present in the accumulation chamber, the first one of material $K_1$ and, "behind this," one of material $K_2$. The piston-like end section 3 is here in its end position 9.

It is noted that the respective melt components can be injected into the melt accumulation chamber 2, but the components can also be introduced directly from the plasticizing motion of the respective screws.

Figure 3:
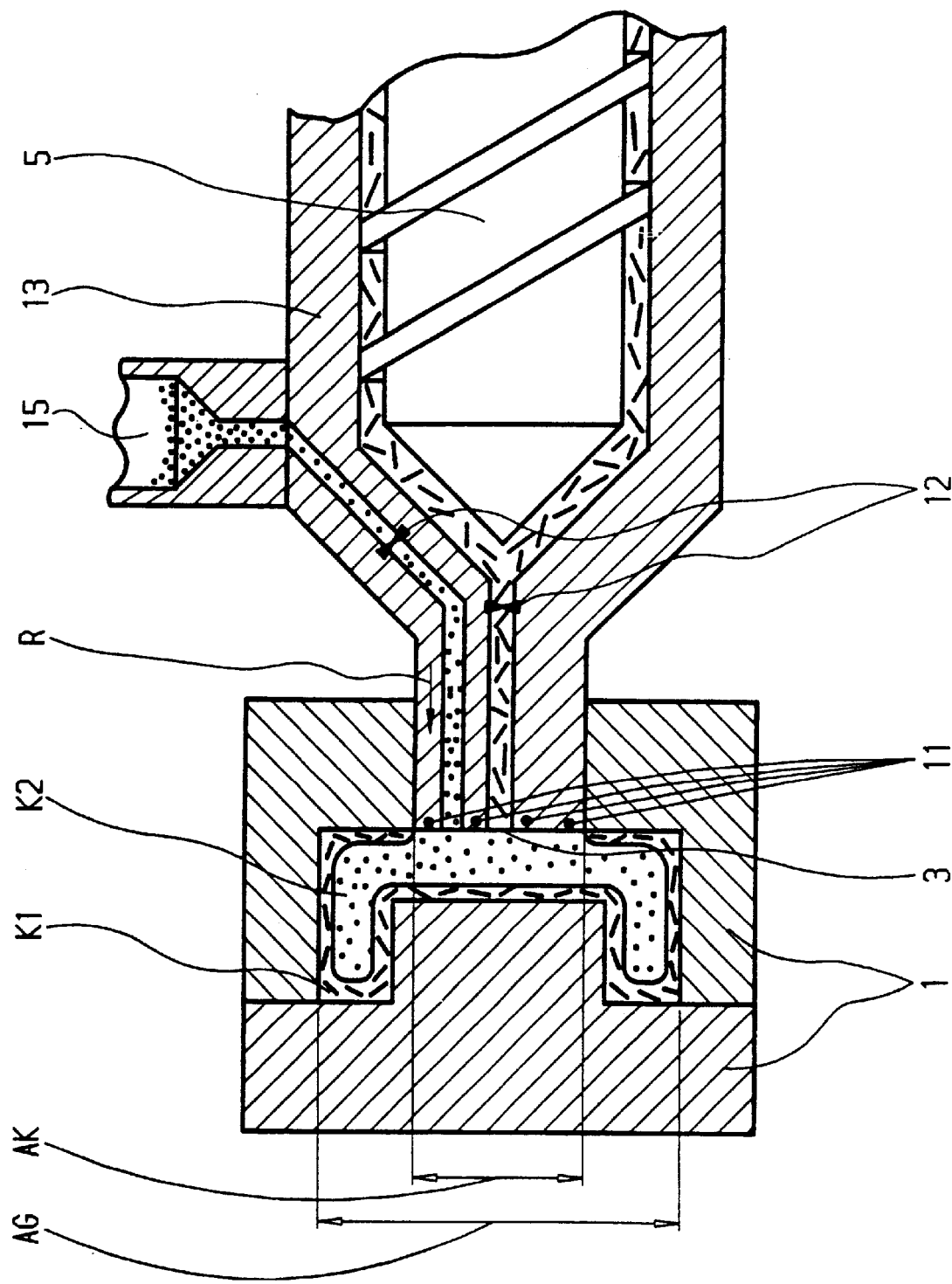
FIG. 3 shows the injection molding apparatus of FIG. 2 during a still later process step.

FIG. 3 shows how the piston at the end of the pre-plasticizing cylinder 13 was shifted from its end position 9 "leftward" in the direction R, thus injecting the melt layers enclosed in the accumulation chamber 2 into the cavity 10. The desired two-layer composite forms in the cavity 10.

As can be seen in FIG. 3, the surface of the piston-like end section 3 $A_K$ constitutes a considerable fraction of the total projected surface $A_G$ of the molded part that is being injected. As a result, the pressure applied through the piston surface 3 is distributed uniformly over the entire projected surface of the molded part, in much better fashion than in the prior art.

This figure further shows that the resulting molded part is essentially encased by the first component, while the piston-like end section 3 has only the second component. In certain applications, this is to be regarded as a deficiency.

Figure 4:
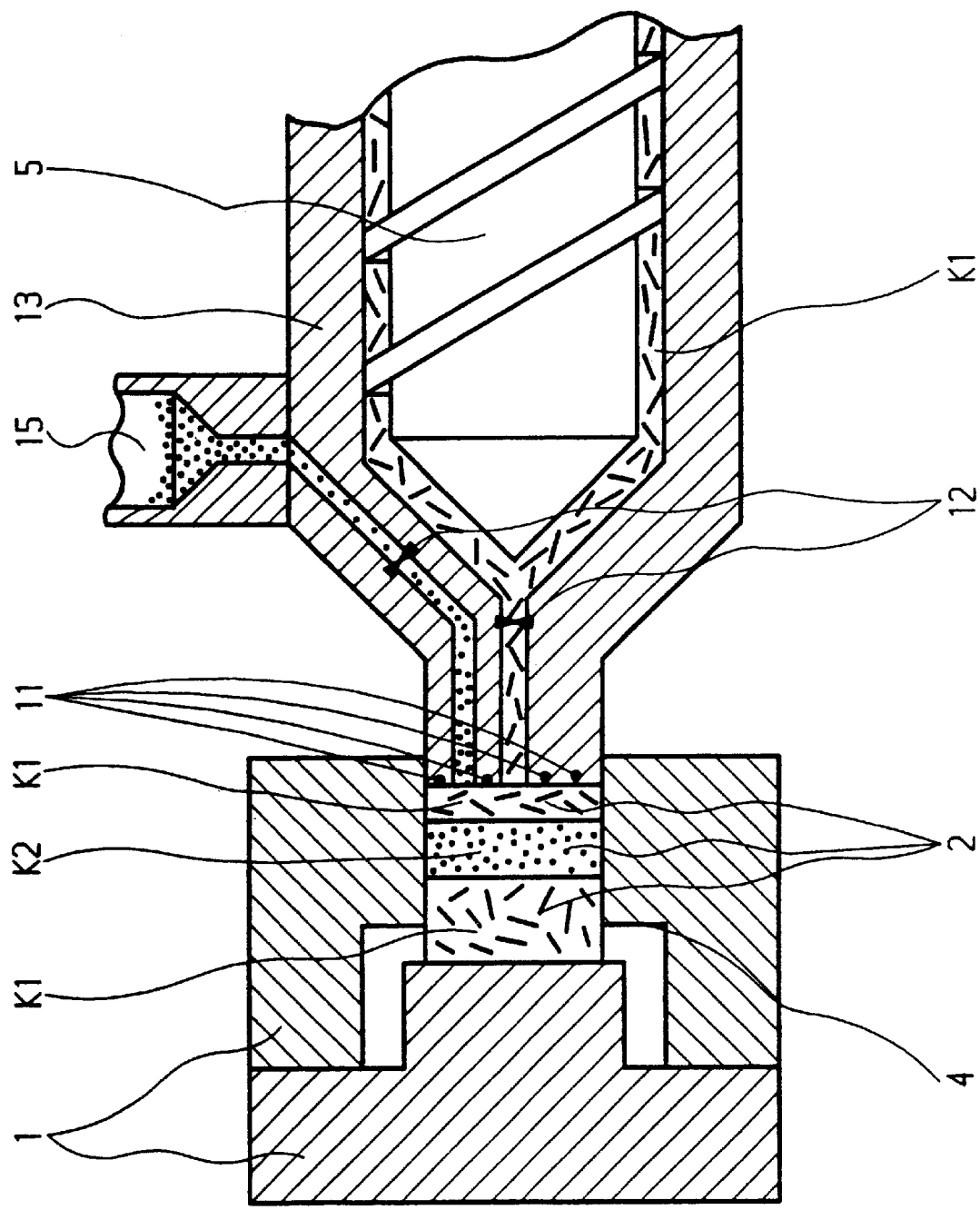
FIG. 4 shows the condition of the injection molding apparatus of FIG. 1 before injection, in the case of a modified method.
Figure 5A:
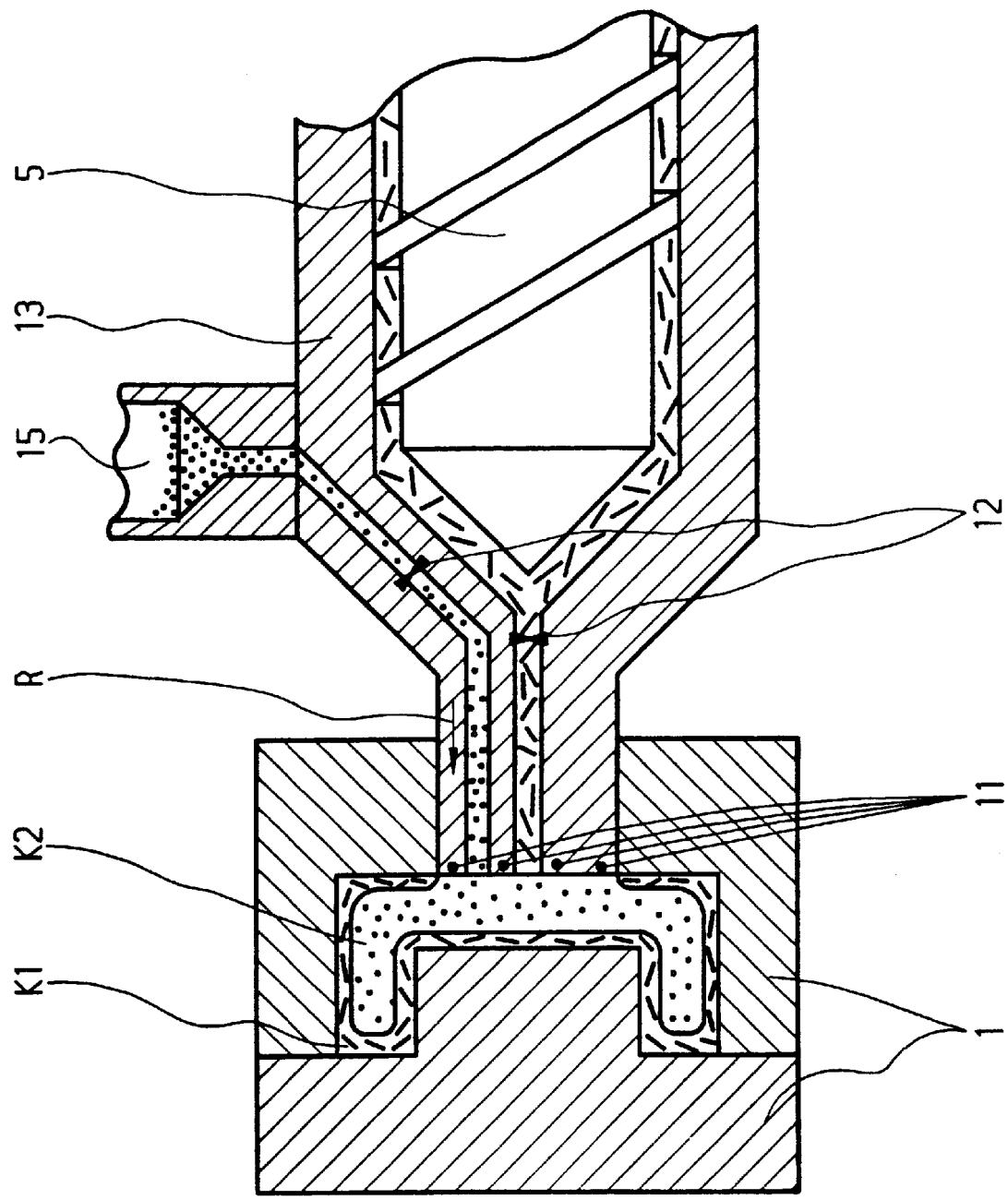
FIGS. 5a and 5b show the modified method of FIG. 4 at a later time in the process.
Figure 5B:
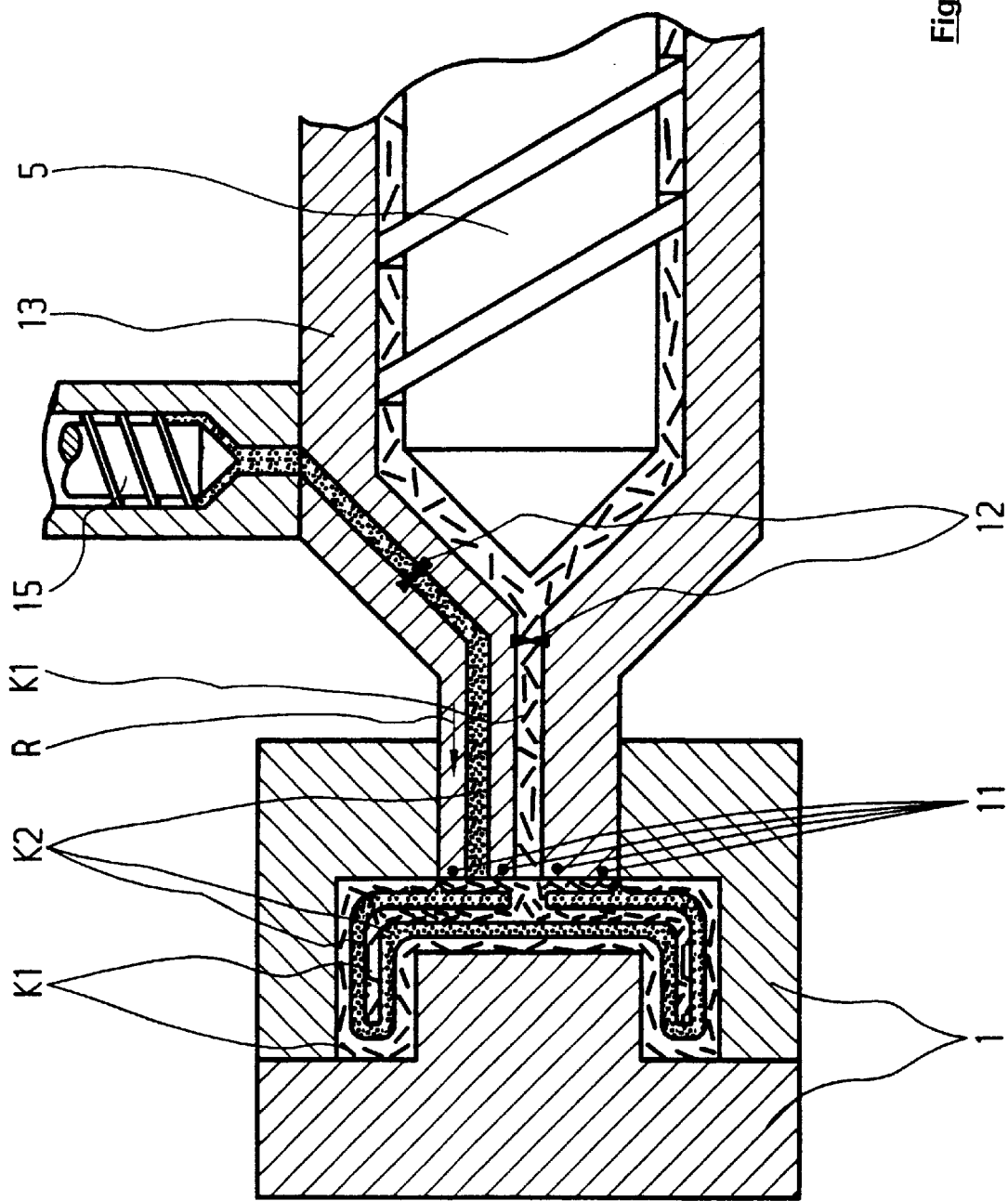

FIG. 4 shows an embodiment to overcome this deficiency. After the first plastic component and then the second one have been introduced into the melt accumulation chamber 2, some of the first plastic component is introduced once again. This therefore results in a layer composite the first, second, and again the first plastic component. If this layer composite is introduced into the cavity 10 by means of the piston-like end section 3, in the manner described above, the melt distribution is such as sketched in FIG. 5a. In this embodiment, the second plastic material is completely encased by the first plastic melt. The five-layer structure of the melt distribution sketched in FIG. 5b is achieved by appropriate temperature control of the piston-like end section 3.

Figure 6:
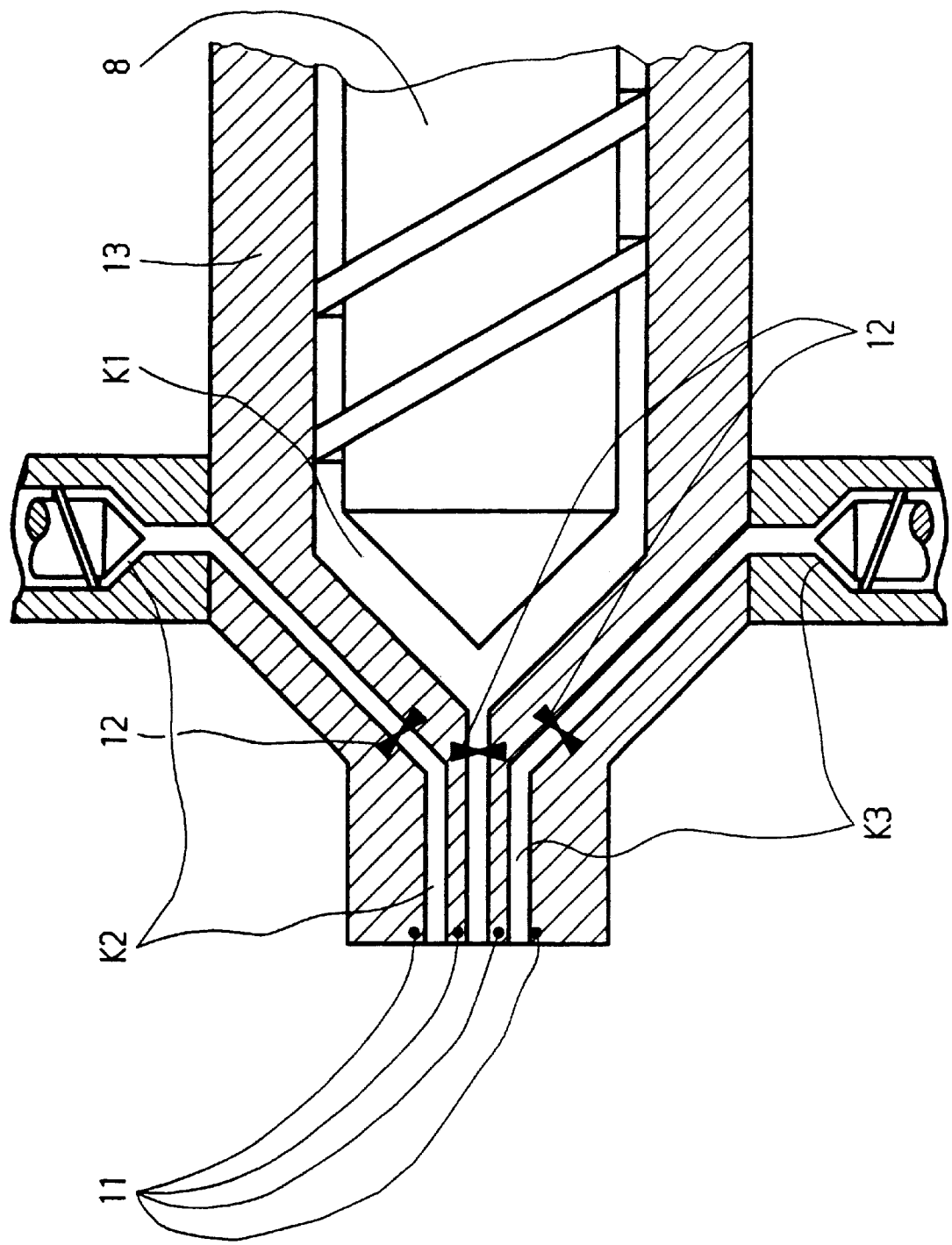
FIG. 6 shows the injection plunger when using three different plastic components.

The inventive method can be utilized in exactly the same way when more than two plastic components are to be processed. For example, FIG. 6 shows how three different materials $K_1$, $K_2$, and $K_3$, can be processed together. Besides the plasticizing unit, which is arranged coaxially with the piston-like end section 3, two other plasticizing units are affixed "on top" and "on bottom" of the axially arranged pre-plasticizing cylinders. The respective melt components are transported in front of the piston-like end section 3 through their corresponding melt flow paths.

Figure 7A:
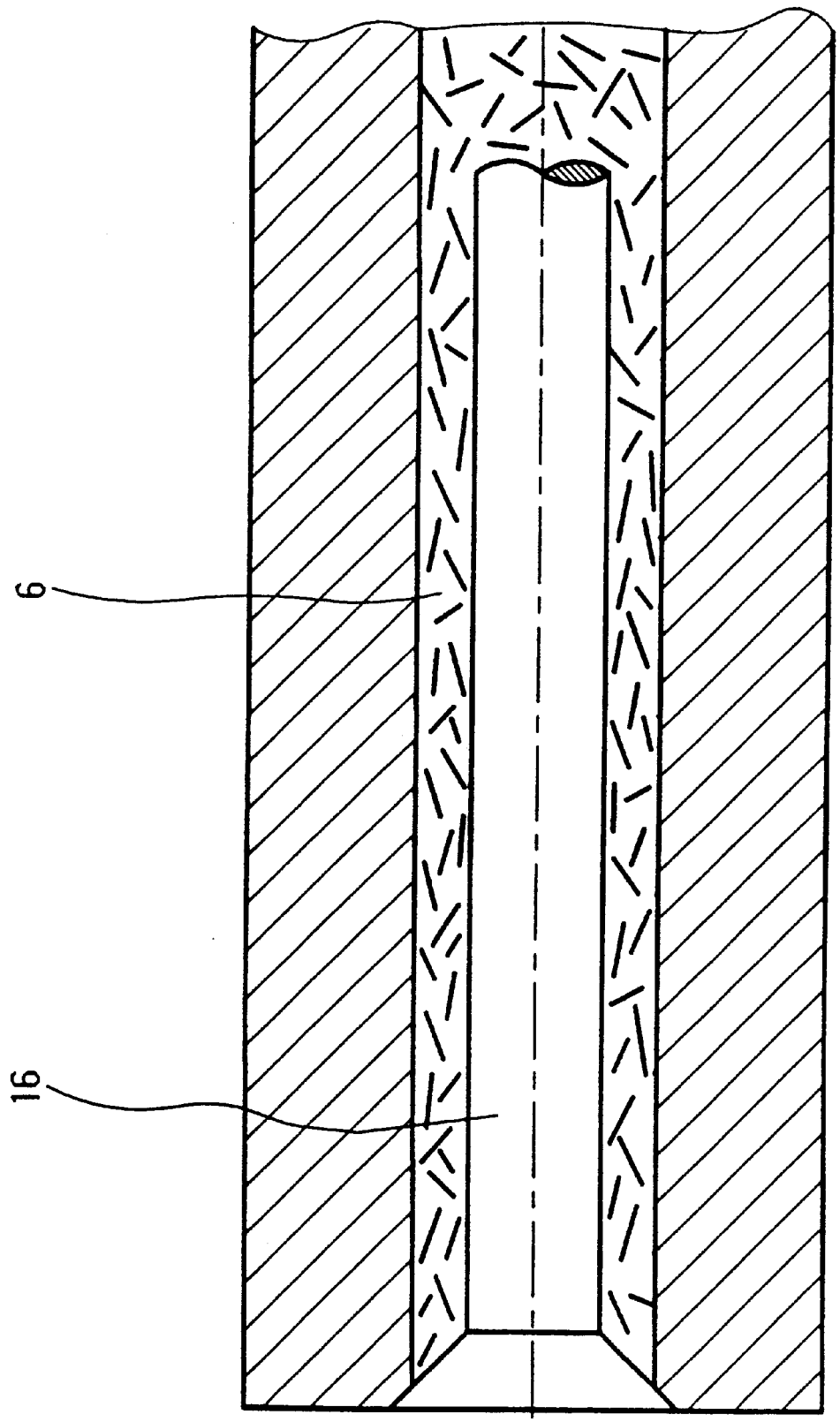
FIGS. 7a and 7b show the end of the injection plunger with an advantageous valve element.
Figure 7B:
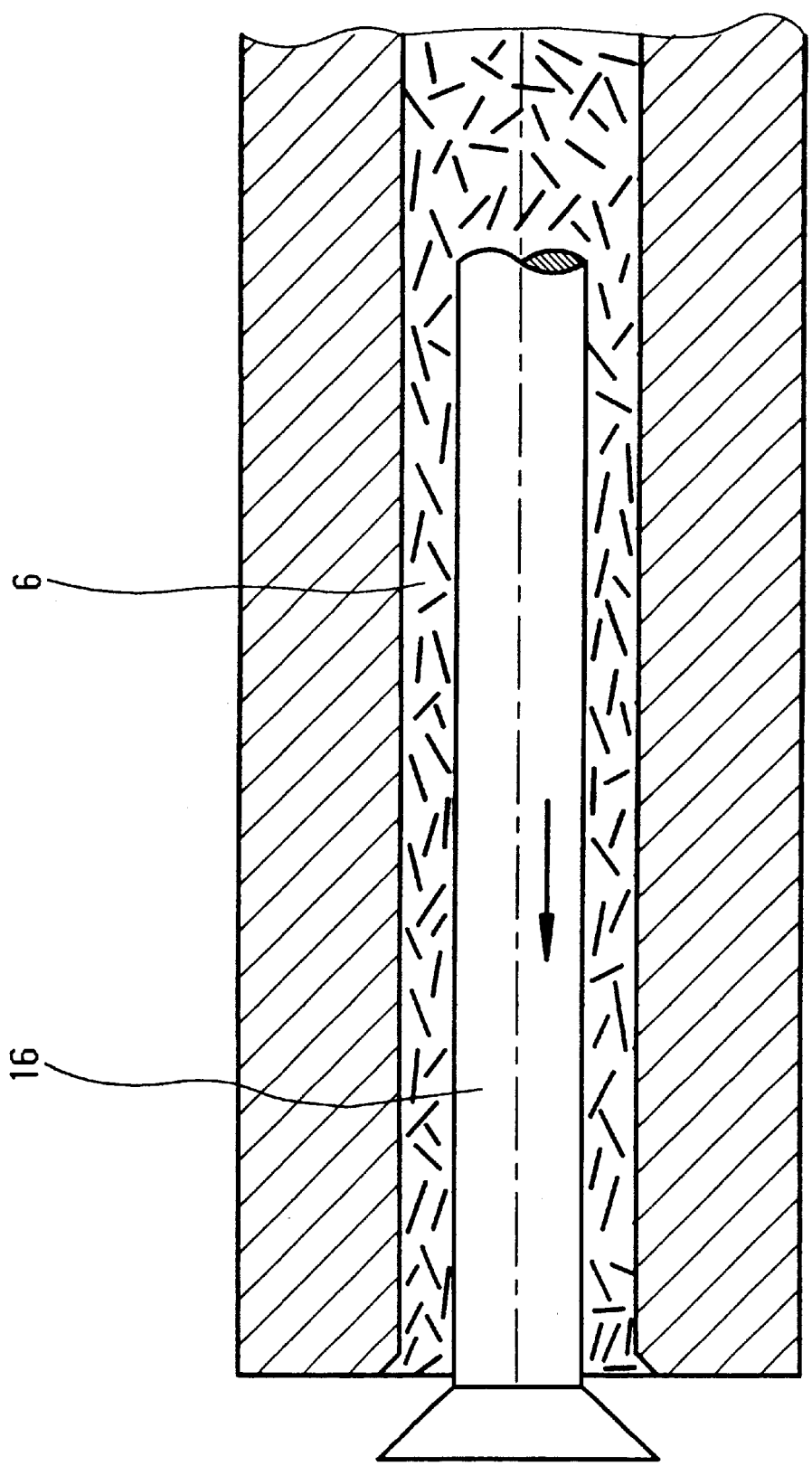

FIGS. 7a and 7b show how the piston-like end section 3 can be equipped with a special mushroom valve 16, as a realization of the valve means 12, which are shown quite generally in FIG. 1. By axially positioning the valve 16 in an appropriate manner, the melt flow path 6 is either opened or closed.

The present idea is applied especially advantageously and economically in the solution shown in FIG. 8. It can be seen there that two injection molding tools 1 are supplied with melt of the different components $K_1$, $K_2$, through an appropriate melt distributor. In this way, two or more cavities can be supplied with melt simultaneously. As an alternative, it is of course also possible—but this case is not shown—that, in the sense of the solution of FIG. 8, two different injection points are provided on one and the same cavity. Especially in the case of large molded parts, it is thus possible to achieve more homogeneous pressure conditions over a large molded part surface.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for the multicomponent injection molding of plastic parts, in which at least two different plastic components are injected into an injection molding tool to form a plastic part, the method comprising:
   a) introducing a first plastic component including a first plastic melt into a melt accumulation chamber, which is bounded by an end section;
   (b) subsequently introducing a second plastic component including a second plastic melt into the melt accumulation chamber to provide a melt in the melt accumulation chamber; and
   c) transferring the plastic melt accumulated in the melt accumulation chamber into the injection molding tool;
   wherein when the plastic melt is transferred in accordance with the above step c), the end section of the melt accumulation chamber is moved in such a way that it forms part of the cavity wall of the injection molding tool.

2. The method of claim 1, wherein after step b) and before step c), more plastic component is introduced into the melt accumulation chamber.

3. The method of claim 1, wherein the end section of the melt accumulation chamber is situated at an end position before the plastic melt begins to be transferred into the injection molding tool.

4. The method of claim 1, wherein the plastic melt accumulated in the melt accumulation chamber is transferred into the injection molding tool in a manner that is controlled or regulated at least part of the time.

5. The method of claim 4, wherein the regulation or control is effected as a function of the melt pressure in the melt accumulation chamber.

6. The method of claim 4, wherein the regulation or control is effected as a function of time, path, or pressure.

7. The method of claim 1, wherein after the plastic melt accumulated in the melt accumulation chamber has been transferred into the injection molding tool, the follow-up pressure is applied to the melt through the end section of the melt accumulation chamber.

8. The method of claim 1, wherein the region of the end section of the melt accumulation chamber is temperature-controlled at least some of the time.

9. The method of claim 1, wherein when the plastic melt accumulated in the melt accumulation chamber is transferred into the injection molding tool, a film positioned there is back-molded.

10. The method of claim 1, wherein when the plastic melt in the accumulation chamber is transferred into the injection molding tool, a textile material situated there is back-molded.

11. The method of claim 1, wherein after the plastic melt accumulated in the melt accumulation chamber is transferred into the injection molding tool, a compression process is performed through the end section.

12. A method for the multicomponent injection molding of plastic parts, in which at least two different plastic components are injected into an injection molding tool to form a plastic part, the method comprising:

a) introducing a first plastic component including a first plastic melt into a melt accumulation chamber, which is bounded by a piston end section;

b) subsequently introducing a second plastic component including a second plastic melt into the melt accumulation chamber to provide a melt in the melt accumulation chamber; and c) transferring the plastic melt accumulated in the melt accumulation chamber into the injection molding tool;

wherein when the plastic melt is transferred in accordance with the above step c), the piston end section of the melt accumulation chamber is moved in such a way that it forms part of the cavity wall of the injection molding tool.

* * * * *